United States Patent
Mankame et al.

(10) Patent No.: US 11,981,238 B2
(45) Date of Patent: May 14, 2024

(54) ANTI-SUBMARINING SEAT CUSHION FOR A VEHICLE CONSTRUCTED OF AN ANISOTROPIC MATERIAL

(71) Applicant: GM Global Technology Operations LLC, Detroit, MI (US)

(72) Inventors: Nilesh D. Mankame, Ann Arbor, MI (US); Chin-Hsu Lin, Troy, MI (US); Daniel W. Booth, Bloomfield Hills, MI (US); Brennon L. White, Novi, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 220 days.

(21) Appl. No.: 17/844,225

(22) Filed: Jun. 20, 2022

(65) Prior Publication Data
US 2023/0406178 A1 Dec. 21, 2023

(51) Int. Cl.
*B60N 2/70* (2006.01)
(52) U.S. Cl.
CPC ..................... *B60N 2/70* (2013.01)
(58) Field of Classification Search
CPC .......... B60N 2/70; B60N 2/42; B60N 2/4214; B60N 2/7094; B60N 2/4221; B60N 2/4263; B60N 2/42718; B60N 2/7017
See application file for complete search history.

(56) References Cited

U.S. PATENT DOCUMENTS

| | | | |
|---|---|---|---|
| 7,373,678 B2 * | 5/2008 | Hetzel | A47C 7/021 5/655.4 |
| 7,891,033 B2 * | 2/2011 | Loewenthal | A61G 5/1043 297/452.21 |
| 10,703,233 B1 | 7/2020 | Booth et al. | |
| 2014/0132054 A1 * | 5/2014 | Steinmeier | B60N 2/4263 297/452.48 |
| 2019/0070986 A1 * | 3/2019 | Sharif | B60N 2/4279 |
| 2019/0090656 A1 * | 3/2019 | Duncan | B60R 21/207 |
| 2020/0307432 A1 * | 10/2020 | Nagasawa | B60N 2/42718 |
| 2021/0237628 A1 * | 8/2021 | Beaurenaut | B60N 2/4263 |

* cited by examiner

*Primary Examiner* — Mark R Wendell
(74) *Attorney, Agent, or Firm* — Vivacqua Crane, PLLC

(57) ABSTRACT

An anti-submarining seat cushion for a vehicle includes a main body constructed of an anisotropic material. The anisotropic material includes a primary material including a primary stiffness and a plurality of inserts that are dispersed throughout the primary material. The plurality of inserts exert an axial compressive force in response to the main body of the anti-submarining seat cushion experiencing a submarining load, where the axial compressive force is exerted in a direction that opposes the submarining load to increase an overall stiffness of the main body in a direction that aligns with the submarining load.

20 Claims, 3 Drawing Sheets

ANTI-SUBMARINING SEAT CUSHION FOR A VEHICLE CONSTRUCTED OF AN ANISOTROPIC MATERIAL

INTRODUCTION

The present disclosure relates to an anti-submarining seat cushion for a vehicle, where the seat cushion is constructed of an anisotropic material. More particularly, the anisotropic material is composed of a primary material and a plurality of inserts that are dispersed throughout the primary material.

Vehicle seats generally include a seat cushion and a seat back. If the vehicle seat is in a reclined position during a sudden deceleration experienced during a vehicle impact event, then a lower part of an occupant's body may be pushed deep into the seat cushion and slip beneath the occupant's lap belt, which is referred to as submarining. Sleep and relax seats include seat backs that are able to recline at relatively high angles of forty-five degrees or more. The relatively high recline angles found in sleep and relax seats may increase the tendency of an occupant to submarine when the vehicle undergoes a sudden deceleration.

There are several approaches currently available for reducing the possibility that an occupant may submarine. For example, thigh airbags or specially designed contour features may be introduced to reduce submarining, however, these approaches introduce cost and complexity or reduce the occupant's comfort. Indeed, simply increasing the stiffness of the material in the seat cushion to mitigate submarining may result in reduced occupant comfort.

Thus, while current vehicle seats achieve their intended purpose, there is a need in the art for an improved, cost-effective approach to provide an anti-submarining seat cushion without compromising occupant comfort.

SUMMARY

According to several aspects, an anti-submarining seat cushion for a vehicle is disclosed. The anti-submarining seat cushion includes a main body constructed of an anisotropic material. The anisotropic material includes a primary material including a primary stiffness, and a plurality of inserts that are dispersed throughout the primary material. The plurality of inserts exert an axial compressive force in response to the main body of the anti-submarining seat cushion experiencing a submarining load, where the axial compressive force is exerted in a direction that opposes the submarining load to increase an overall stiffness of the main body in a direction that aligns with the submarining load.

In an aspect, the plurality of inserts are oriented at a primary angle, and wherein the primary angle varies between each insert based on a local magnitude and a local direction of the submarining load.

In another aspect, the plurality of inserts are urged into a bending dominated deformation in response to a normal load being exerted upon the anti-submarining seat cushion.

In yet another aspect, the overall stiffness of the main body is greater than the primary stiffness of the primary material when the axial compressive force is exerted.

In an aspect, the primary stiffness of the primary material is substantially unaffected when a normal load is exerted upon the upper surface of the anti-submarining seat cushion, and wherein the normal load is exerted by an occupant sitting upon the anti-submarining seat cushion.

In another aspect, an orientation, a density, and a material of each of the plurality of inserts varies throughout the primary material of the anti-submarining seat cushion based on a local magnitude and a local direction of the of the submarining load.

In another aspect, the plurality of inserts are constructed of a foam material having a an elastic storage modulus that is at least twenty-five percent greater than the primary material.

In yet another aspect, the primary stiffness is selected based on occupant comfort.

In an aspect, the anisotropic material exhibits the primary stiffness in response to a normal load being exerted upon the anti-submarining seat cushion.

In an aspect, a vehicle seat assembly includes a seat pan and an anti-submarining seat cushion supported by the seat pan. The anti-submarining seat cushion includes a main body constructed of an anisotropic material. The anisotropic material includes a primary material including a primary stiffness and a plurality of inserts that are dispersed throughout the primary material. The plurality of inserts are oriented at the primary angle to exert an axial compressive force in response to the main body of the anti-submarining seat cushion experiencing a submarining load, where the axial compressive force is exerted in a direction that opposes the submarining load to increase an overall stiffness of the main body in a direction that aligns with the submarining load.

In an aspect, the plurality of inserts are oriented at a primary angle, and wherein the primary angle varies between each insert based on a local magnitude and a local direction of the submarining load.

In another aspect, the plurality of inserts are urged into a bending dominated deformation in response to a normal load being exerted upon the anti-submarining seat cushion.

In another aspect, the wherein the overall stiffness of the main body is greater than the primary stiffness of the primary material when the axial compressive force is exerted.

In yet another aspect, the primary stiffness of the primary material is substantially unaffected when a normal load is exerted upon the upper surface of the anti-submarining seat cushion, and the normal load is exerted by an occupant sitting upon the anti-submarining seat cushion.

In an aspect, an orientation, a density, and a material of each of the plurality of inserts varies throughout the primary material of the anti-submarining seat cushion based on a local magnitude and a local direction of the of the submarine load.

In another aspect, the plurality of inserts are constructed of a foam material having an elastic storage modulus that is at least twenty-five percent greater than the primary material.

In yet another aspect, the vehicle seat assembly is one of a sleep seat and a relax seat.

In an aspect, an anti-submarining seat cushion for a vehicle is disclosed, and includes a main body constructed of is constructed of a primary material having a primary stiffness and a secondary material having a secondary stiffness, where the an elastic storage modulus of the secondary material is at least twenty-five percent greater than an elastic storage modulus of the primary material, and a region of the main body is constructed of the secondary material and is shaped to conform with a pelvis and an upper thigh region of an occupant.

In another aspect, the region is shaped to include a contour line oriented in a transverse direction across the anti-submarining seat cushion, and wherein the contour line includes a peak portion disposed between two valleys.

In yet another aspect, the two valleys coincide with thighs of the occupant and the peak portion coincides with an area where the thighs of the occupant are splayed apart.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
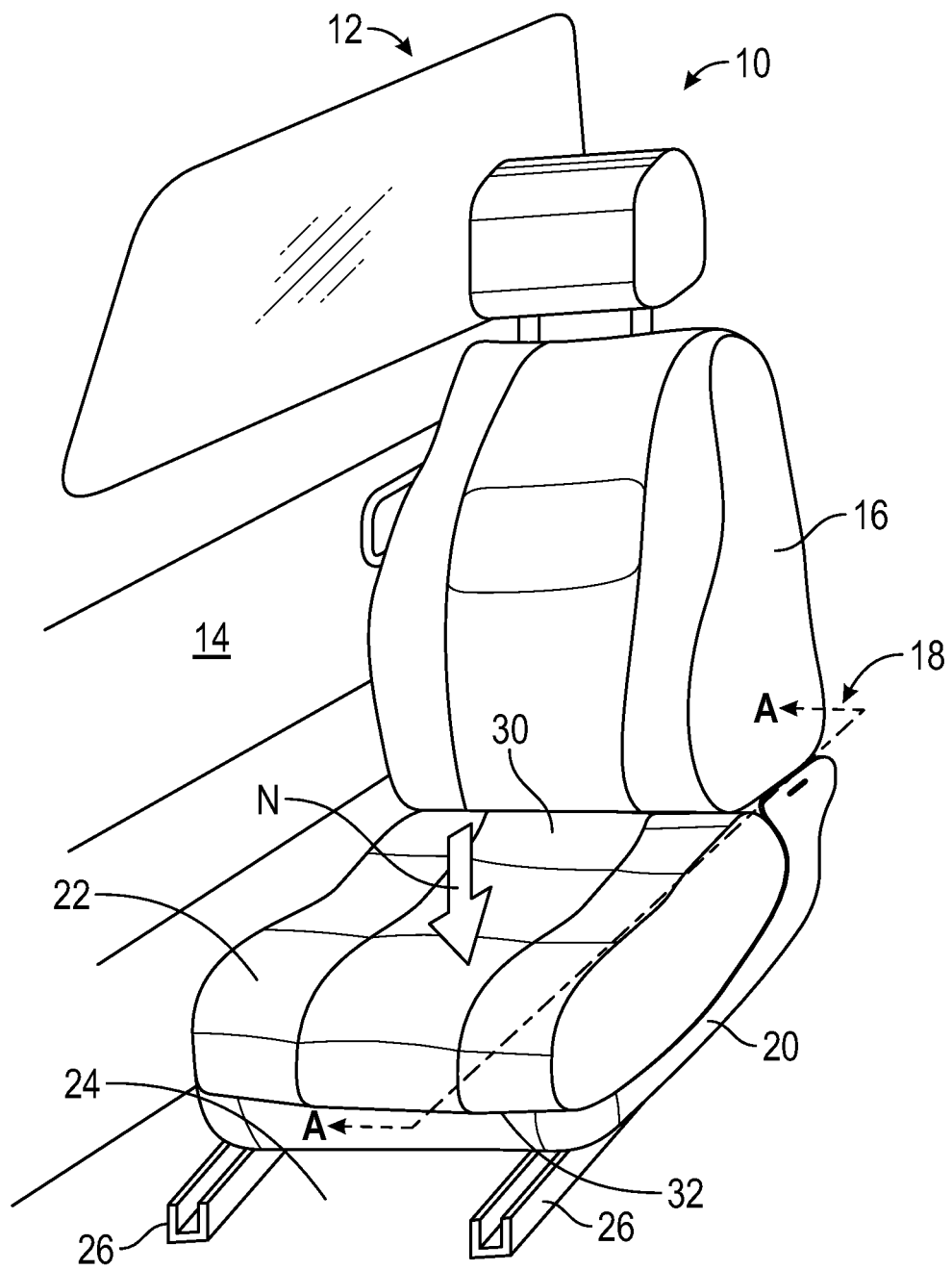
FIG. 1 is a perspective view of a vehicle seat assembly including the disclosed anti-submarining seat cushion in a vehicle, according to an exemplary embodiment.

Referring to FIG. 1, an exemplary vehicle seat assembly 10 disposed within an interior cabin 14 of a vehicle 12 is illustrated. The vehicle 12 may be any type of vehicle such as, but not limited to, a sedan, truck, sport utility vehicle, van, or motor home. In an embodiment, the vehicle 12 may be an aircraft or a marine vehicle as well. The vehicle seat assembly 10 includes a seat back 16 and a lower seat assembly 18. The lower seat assembly 18 includes a seat pan 20 and an anti-submarining seat cushion 22, where the anti-submarining seat cushion 22 is supported by the seat pan 20. The seat pan 20 is operatively connected to a floor 24 of the vehicle 12 using any type of structure 26. In the example as shown in FIG. 1, the structure 26 is a pair of seat tracks. The anti-submarining seat cushion 22 defines an upper surface 30 and a lower surface 32. In one non-limiting embodiment, the vehicle seat assembly 10 is either a sleep or relax seat.

Figure 2:
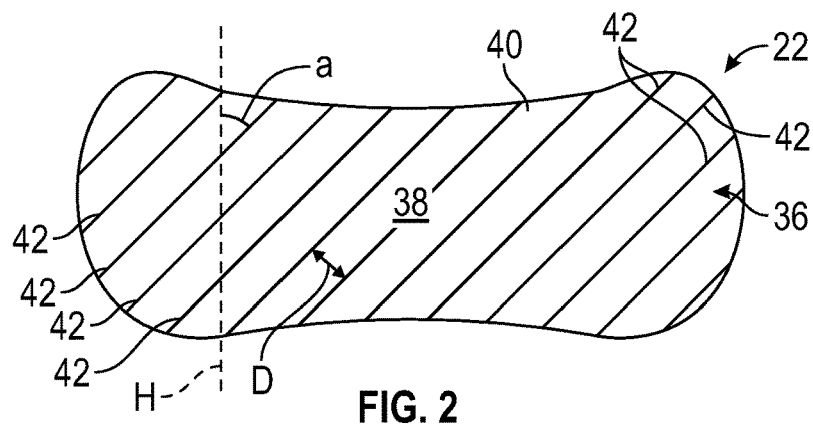
FIG. 2 is a cross-sectioned view of the anti-submarining seat cushion shown in FIG. 1 taken along section line A-A, according to an exemplary embodiment.

FIG. 2 is a cross-sectioned view of the anti-submarining seat cushion 22 shown in FIG. 1, taken along section line A-A. Referring to both FIGS. 1 and 2, the anti-submarining seat cushion 22 includes a main body 36 constructed of an anisotropic material 38. Although FIG. 2 illustrates the entire main body 36 of the anti-submarining seat cushion 22 constructed of the anisotropic material 38, it is to be appreciated that FIG. 2 is merely exemplary in nature, and in embodiments only a portion or specific areas of the main body 36 of the anti-submarining seat cushion 22 may include the anisotropic material 38. When an occupant is seated upon and supported by the anti-submarining seat cushion 22 during normal operation of the vehicle 12, a substantially normal load N is exerted upon the upper surface 30 of the anti-submarining seat cushion 22. As explained below, the anisotropic material 38 exhibits a primary stiffness when an occupant is seated upon the anti-submarining seat cushion 22 during normal operation of the vehicle 12 when the substantially normal load N is exerted. However, the anisotropic material 38 exhibits an increased overall stiffness in response to an occupant exerting a submarining load S (seen in FIG. 3B) when the vehicle 12 undergoes a sudden deceleration, where the increase in overall stiffness substantially prevents the occupant from submarining in the vehicle seat assembly 10.

The anisotropic material 38 is composed of a primary material 40 and a plurality of inserts 42 that are dispersed throughout the primary material 40. The plurality of inserts 42 are oriented at a primary angle a relative to a horizontal axis H such that the primary stiffness of the primary material 40 remains substantially unchanged in response to an occupant sitting upon the anti-submarining seat cushion 22 during normal operation. It is to be appreciated that a magnitude and direction of the submarine load S (FIG. 3B) varies across the upper surface 30 of the anti-submarining seat cushion 22 when the vehicle 12 undergoes a sudden deceleration. Accordingly, an orientation, a density, and a material of each of the plurality of inserts 42 varies throughout the primary material 40 of the anti-submarining seat cushion 22 based on a local magnitude and a local direction of the of the submarine load S. Thus, although FIG. 2 illustrates a uniform orientation of the inserts 42, where the primary angle a is uniform between each of the inserts 42, it is to be appreciated that the primary angle a varies between the inserts 42 to align with the local magnitude and the local direction of the submarine load S. A transverse distance D is measured between each of the plurality of inserts 42, where the transverse distance D indicates the density of the inserts 42. Thus, although FIG. 2 illustrates a uniform density, where the transverse distance D is uniform between each of the inserts 42, it is to be appreciated that the transverse distance D between the each of the plurality of inserts 42 varies to align with the local magnitude and the local direction of the submarine load S as well. As explained below, a material of the inserts 42 and a thickness of the inserts 42 vary as well throughout the anti-submarining seat cushion 22 based on the local magnitude and the local direction of the submarine load S.

Figure 3A:
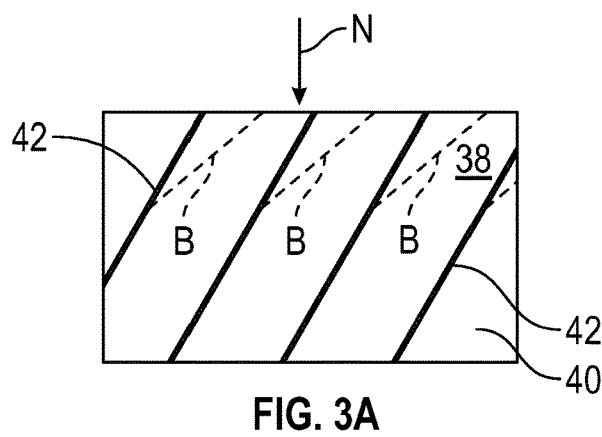
FIG. 3A is an enlarged view of an anisotropic material of the anti-submarining seat cushion when a normal load is exerted upon the anti-submarining seat cushion, according to an exemplary embodiment.
Figure 3B:
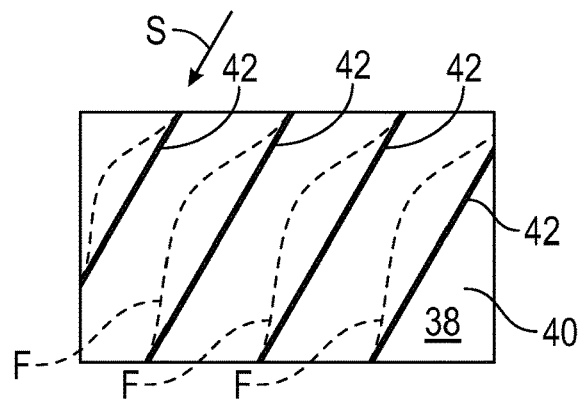
FIG. 3B is an enlarged view of the anisotropic material of the anti-submarining seat cushion when a submarining load is exerted upon the anti-submarining seat cushion, according to an exemplary embodiment.

FIG. 3A is an enlarged view of the anisotropic material 38 when the normal load N is exerted upon the upper surface 30 (FIG. 1) of the anti-submarining seat cushion 22, and FIG. 3B is an enlarged view of the anisotropic material 38 when the submarining load S is exerted upon the upper surface 30 of the anti-submarining seat cushion 22. The submarining load S is exerted upon the anti-submarining seat cushion 22 when the vehicle 12 undergoes a sudden deceleration. Referring to FIGS. 2 and 3A, the primary stiffness of the primary material 40 is selected for occupant comfort. That is, the primary stiffness of the primary material 40 is selected based on user preferences regarding seat comfort in addition to other factors such as, for example, regulation requirements, durability considerations, and vehicle type (for example, a sports car seat would be stiffer than a family sedan). One example of the primary material 40 includes, but is not limited to, polyurethane foam.

Referring to FIGS. 1 and 3A, the plurality of inserts 42 are urged into a bending dominated deformation B (the bending dominated deformation B is shown in dashed line in FIG. 3A) in response to the normal load N being exerted upon the upper surface 30 of the anti-submarining seat cushion 22, where the normal load N is exerted by an occupant sitting upon the anti-submarining seat cushion 22. It is to be appreciated that the plurality of inserts 42 include a relatively low bending stiffness, and therefore the primary stiffness of the primary material 40 is substantially unaffected when the normal load N is exerted upon the upper surface 30 of the anti-submarining seat cushion 22. In other words, the primary stiffness of the primary material 40 remains substantially unaffected so an occupant sitting upon the anti-submarining seat cushion 22 would not readily notice a change in stiffness.

FIG. 3B is an enlarged view of the anisotropic material 38 when the submarining load S is exerted upon the upper surface 30 (FIG. 1) of the anti-submarining seat cushion 22 when the vehicle 12 undergoes a sudden deceleration. Referring to FIGS. 1 and 3A, the primary angle a is dimensioned to create an axial compressive force in addition to bending, and therefore the plurality of inserts 42 experience an axial compressive bending F in response to the main body 36 of the anti-submarining seat cushion 22 experiencing the submarining load S, where the axial compressive bending F is shown in dashed line in FIG. 3B. As mentioned above, the submarining load S is exerted by an occupant sitting upon the anti-submarining seat cushion 22 when the vehicle 12 undergoes a sudden deceleration. The axial compressive force exerted by the plurality of inserts 42 is in a direction that opposes the submarining load S, and serves to increase an overall stiffness of the main body 36 of the anti-submarining seat cushion 22 in a direction that aligns with the submarining load S. Specifically, the overall stiffness of the main body 36 of the anti-submarining seat cushion 22 is substantially augmented by the plurality of inserts 42 along the direction that aligns with the submarining load S. That is, the overall stiffness along the direction of the submarining load S of the main body 36 of the anti-submarining seat cushion 22 is greater than the primary stiffness of the primary material 40 when the vehicle 12 undergoes a sudden deceleration. The net axial compressive force exerted by the plurality of inserts 42 resists the submarining of the occupant in the vehicle seat assembly 10 when the vehicle 12 suddenly decelerates. In one embodiment, the plurality of inserts 42 are oriented based on an assumption that the occupant is a 50th percentile male or female.

Figure 4:
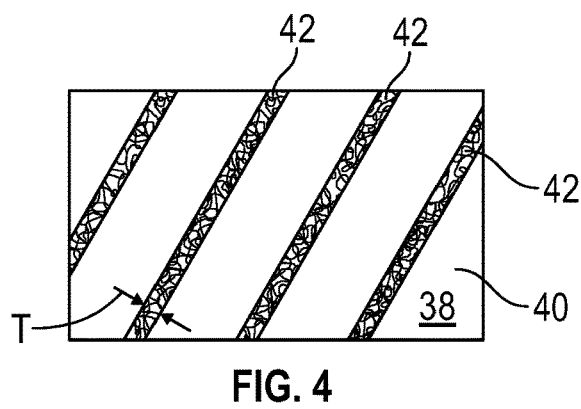
FIG. 4 is an alternative embodiment of the anisotropic material shown in FIGS. 3A and 3B, according to an exemplary embodiment.

In the embodiment as shown in FIGS. 2, 3A, and 3B, the plurality of inserts 42 are elongated members that extend from the upper surface 30 to the lower surface 32 of the anti-submarining seat cushion 22. However, in an alternative embodiment, the plurality of inserts 42 extend only partially through the anti-submarining seat cushion 22. FIG. 4 is yet another alternative embodiment of the anti-submarining seat cushion 22, where the plurality of inserts 42 are constructed of a foam material. The foam material of the plurality of inserts 42 has an elastic storage modulus that is at least twenty five percent greater than that of the primary material 40. As seen in FIG. 4, the foam material of the plurality of inserts 42 also define a thickness T. It is to be appreciated that the thickness T of each insert 42 varies to accommodate the local magnitude and the local direction of the submarine load S, where a greater thickness T is provided in areas where the local magnitude of the submarine load S is the greatest. It is to be appreciated that that in embodiments, only a portion of the plurality of inserts 42 are constructed of the foam material, and a remaining portion of the inserts 42 are elongated members, where selection of the material of the inserts 42 is based on the local magnitude and the local direction of the submarine load S.

Figure 5A:
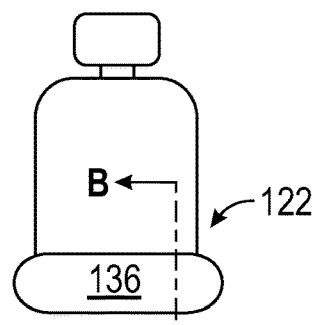
FIG. 5A is a front view of another embodiment of the anti-submarining seat cushion, according to an exemplary embodiment.
Figure 5B:
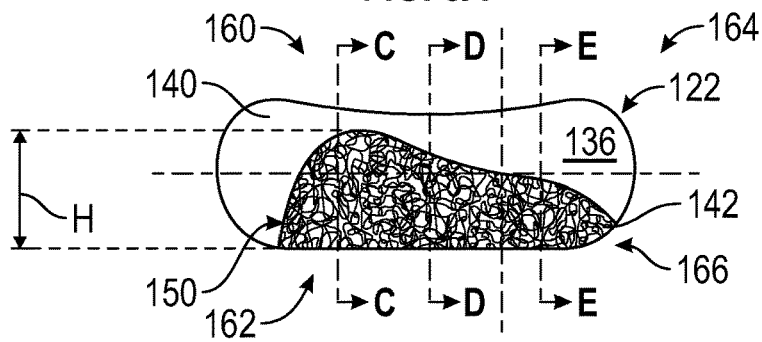
FIG. 5B is a cross-sectioned view of the anti-submarining seat cushion taken along section line B-B shown in FIG. 5A, according to an exemplary embodiment.
Figure 5C:
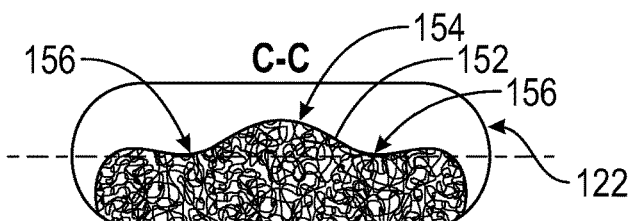
FIG. 5C is a cross-sectioned view of the anti-submarining seat cushion taken along section line C-C in FIG. 5B, according to an exemplary embodiment.
Figure 5D:
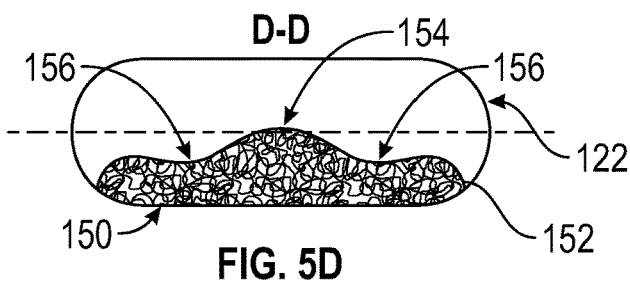
FIG. 5D is a cross-sectioned view of the anti-submarining seat cushion taken along section line D-D in FIG. 5B, according to an exemplary embodiment.

FIGS. 5A-5E illustrate an alternative embodiment of an anti-submarining seat cushion 122, where FIG. 5A is a front view and FIG. 5B is a sectioned view of the of the anti-submarining seat cushion 122 taken along section line B-B in FIG. 5A. Referring to FIGS. 5A and 5B, a main body 136 of the anti-submarining seat cushion 122 is constructed of a primary material 140 having a primary stiffness and a secondary material 142 having a secondary stiffness, where an elastic storage modulus of the secondary material 142 is at least twenty-five percent greater than the an elastic storage modulus of the primary material 140. As explained below, a region 150 of the anti-submarining seat cushion 122 is constructed of the secondary materials 142. The region 150 of the anti-submarining seat cushion 122 is shaped to conform with portions a lower body of an occupant to enhance occupant comfort, while at the same time performing an anti-submarining function.

Referring specifically to FIG. 5B, the anti-submarining seat cushion 122 is sectioned into four quadrants including a front upper section 160, a front lower section 162, a rear upper section 164, and a rear lower section 166. In embodiments, the region 150 includes a varying height H, where the varying height H is at a maximum in the front sections 160, 162 and tapers towards the rear sections 164, 166 of the anti-submarining seat cushion 122 to accommodate a pelvis region and an upper thigh region of the occupant. The region 150 including the secondary material 142 is disposed primarily along the lower sections 162, 166 of the anti-submarining seat cushion 122 while the primary material 140, which is selected for occupant comfort, is disposed primarily along the upper sections 160, 164 of the anti-submarining seat cushion 122.

Figure 5E:
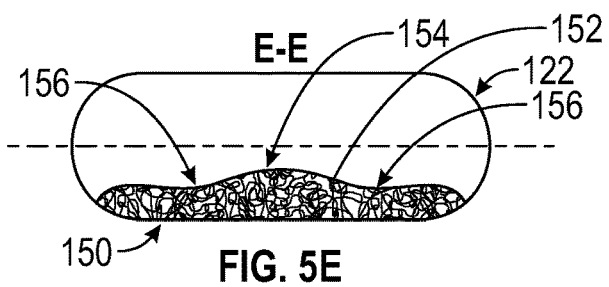
FIG. 5E is a cross-sectioned view of the anti-submarining seat cushion taken along section line E-E in FIG. 5B, according to an exemplary embodiment.

FIG. 5B illustrates section lines C-C, D-D, and E-E, all taken at different distances towards the rear sections 164, 166 of the anti-submarining seat cushion 122. Referring to FIGS. 5B-5E, the region 150 is shaped to include a contour line 152 that is oriented in a transverse direction across the anti-submarining seat cushion 122 to follow the lower body contour of an occupant seated upon of the anti-submarining seat cushion 122. Referring specifically to FIG. 5E, the contour line 152 includes a peak portion 154 disposed between two valleys 156, where the two valleys 156 coincide with the thighs of an occupant and the peak portion 154 coincides with an area where the thighs of the occupant are splayed apart and serves to abut against and resist the forward motion of the pelvis of the occupant when the vehicle 12 undergoes a sudden deceleration. The peak portion 154 and valleys 156 of the contour line 152 decrease in height towards the rear sections 164, 166 of the anti-submarining seat cushion 122 to accommodate the pelvis region and the upper thigh region of an occupant.

Referring generally to the figures, the disclosed anti-submarining seat cushion provides various technical effects and benefits. Specifically, the anti-submarining seat cushion exhibits an anisotropic response where an occupant experiences a lower effective stiffness when he or she is sitting on the disclosed anti-submarining seat cushion during normal operation of the vehicle and a substantially higher effective stiffness during a sudden deceleration event. The primary stiffness is selected based on occupant comfort, regulation requirements, durability considerations, and vehicle type. As seen in FIG. 5B, the raised region of the region 150 in sections 160 and 162 lies between an occupant's legs during normal operation of the vehicle. Therefore, the raised region has minimal interaction with the occupant during normal operation. However, when the vehicle undergoes a sudden deceleration and a submarining load is exerted upon the seat cushion, submarining tendency of the occupant is resisted by physical interference between the occupant's pelvis and the raised region of 150 in sections 160 and 162. This gives rise to a higher effective stiffness that resists the submarining of the occupant during sudden deceleration events. Contouring of the region 150 is determined by balancing the need to achieve a desired level of occupant comfort during normal operation and the need to resist submarining of the occupant during sudden deceleration. The anti-submarining seat cushion may be especially advantageous in sleep or relax seats having that are able to recline at relatively high angles of forty-five degrees or more. Furthermore, in embodiments, the anti-submarining seat cushion may be constructed of two different materials having different stiffnesses, where the stiffer material is shaped to conform with the occupant's lower body to preserve overall occupant comfort.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. An anti-submarining seat cushion for a vehicle, the anti-submarining seat cushion comprising:
   a main body constructed of an anisotropic material, the anisotropic material comprising:
   a primary material including a primary stiffness; and
   a plurality of inserts that are dispersed throughout the primary material, wherein the plurality of inserts exert an axial compressive force in response to the main body of the anti-submarining seat cushion experiencing a submarining load, wherein the axial compressive force is exerted in a direction that opposes the submarining load to increase an overall stiffness of the main body in a direction that aligns with the submarining load.

2. The anti-submarining seat cushion of claim 1, wherein the plurality of inserts are oriented at a primary angle, and wherein the primary angle varies between each insert based on a local magnitude and a local direction of the submarining load.

3. The anti-submarining seat cushion of claim 1, wherein the plurality of inserts are urged into a bending dominated deformation in response to a normal load being exerted upon the anti-submarining seat cushion.

4. The anti-submarining seat cushion of claim 1, wherein the overall stiffness of the main body is greater than the primary stiffness of the primary material when the axial compressive force is exerted.

5. The anti-submarining seat cushion of claim 4, wherein the primary stiffness of the primary material is substantially unaffected when a normal load is exerted upon an upper surface of the anti-submarining seat cushion, and wherein the normal load is exerted by an occupant sitting upon the anti-submarining seat cushion.

6. The anti-submarining seat cushion of claim 1, wherein an orientation, a density, a shape, and a material of each of the plurality of inserts varies throughout the primary material of the anti-submarining seat cushion based on a local magnitude and a local direction of the of the submarine load.

7. The anti-submarining seat cushion of claim 1, wherein the plurality of inserts are constructed of a foam material having an elastic storage modulus that is at least twenty-five percent greater than the primary material.

8. The anti-submarining seat cushion of claim 1, wherein the primary stiffness is selected based on occupant comfort.

9. The anti-submarining seat cushion of claim 1, wherein the anisotropic material exhibits the primary stiffness in response to a normal load being exerted upon the anti-submarining seat cushion.

10. A vehicle seat assembly, comprising:
    a seat pan;
    an anti-submarining seat cushion supported by the seat pan, wherein the anti-submarining seat cushion comprises:
    a main body constructed of an anisotropic material, the anisotropic material comprising:
    a primary material including a primary stiffness; and
    a plurality of inserts that are dispersed throughout the primary material, wherein the plurality of inserts are oriented to exert an axial compressive force in response to the main body of the anti-submarining seat cushion experiencing a submarining load, wherein the axial compressive force is exerted in a direction that opposes the submarining load to increase an overall stiffness of the main body in a direction that aligns with the submarining load.

11. The vehicle seat assembly of claim 10, wherein the plurality of inserts are oriented at a primary angle, and wherein the primary angle varies between each insert based on a local magnitude and a local direction of the submarining load.

12. The anti-submarining seat cushion of claim 10, wherein the plurality of inserts are urged into a bending dominated deformation in response to a normal load being exerted upon the anti-submarining seat cushion.

13. The vehicle seat assembly of claim 10, wherein the overall stiffness of the main body is greater than the primary stiffness of the primary material when the axial compressive force is exerted.

14. The vehicle seat assembly of claim 13, wherein the primary stiffness of the primary material is substantially unaffected when a normal load is exerted upon an upper surface of the anti-submarining seat cushion, and wherein the normal load is exerted by an occupant sitting upon the anti-submarining seat cushion.

15. The vehicle seat assembly of claim 10, wherein an orientation, a density, and a material of each of the plurality of inserts varies throughout the primary material of the anti-submarining seat cushion based on a local magnitude and a local direction of the of the submarine load.

16. The vehicle seat assembly of claim 10, wherein the plurality of inserts are constructed of a foam material having an elastic storage modulus that is at least twenty-five percent greater than the primary material.

17. The vehicle seat assembly of claim 12, wherein the vehicle seat assembly is one of a sleep seat and a relax seat.

18. An anti-submarining seat cushion for a vehicle, the anti-submarining seat cushion comprising:
- a main body constructed of is constructed of a primary material having a primary stiffness and a secondary material having a secondary stiffness, wherein an elastic storage modulus of the secondary material is at least twenty-five percent greater than an elastic storage modulus of the primary material, and a region of the main body is constructed of the secondary material and is shaped to conform with a pelvis and a upper thigh region of an occupant, and a region of the main body is constructed of the secondary material and is shaped to abut against the pelvis when the vehicle undergoes a sudden deceleration.

19. The anti-submarining seat cushion of claim 18, wherein the region is shaped to include a contour line oriented in a transverse direction across the anti-submarining seat cushion, and wherein the contour line includes a peak portion disposed between two valleys.

20. The anti-submarining seat cushion of claim 19, wherein the two valleys coincide with thighs of the occupant and the peak portion coincides with an area where the thighs of the occupant are splayed apart.

* * * * *